July 31, 1951  W. E. KOCK  2,562,277
METALLIC LENS DIRECTIVE ANTENNA SYSTEM
Filed April 8, 1946  4 Sheets-Sheet 3

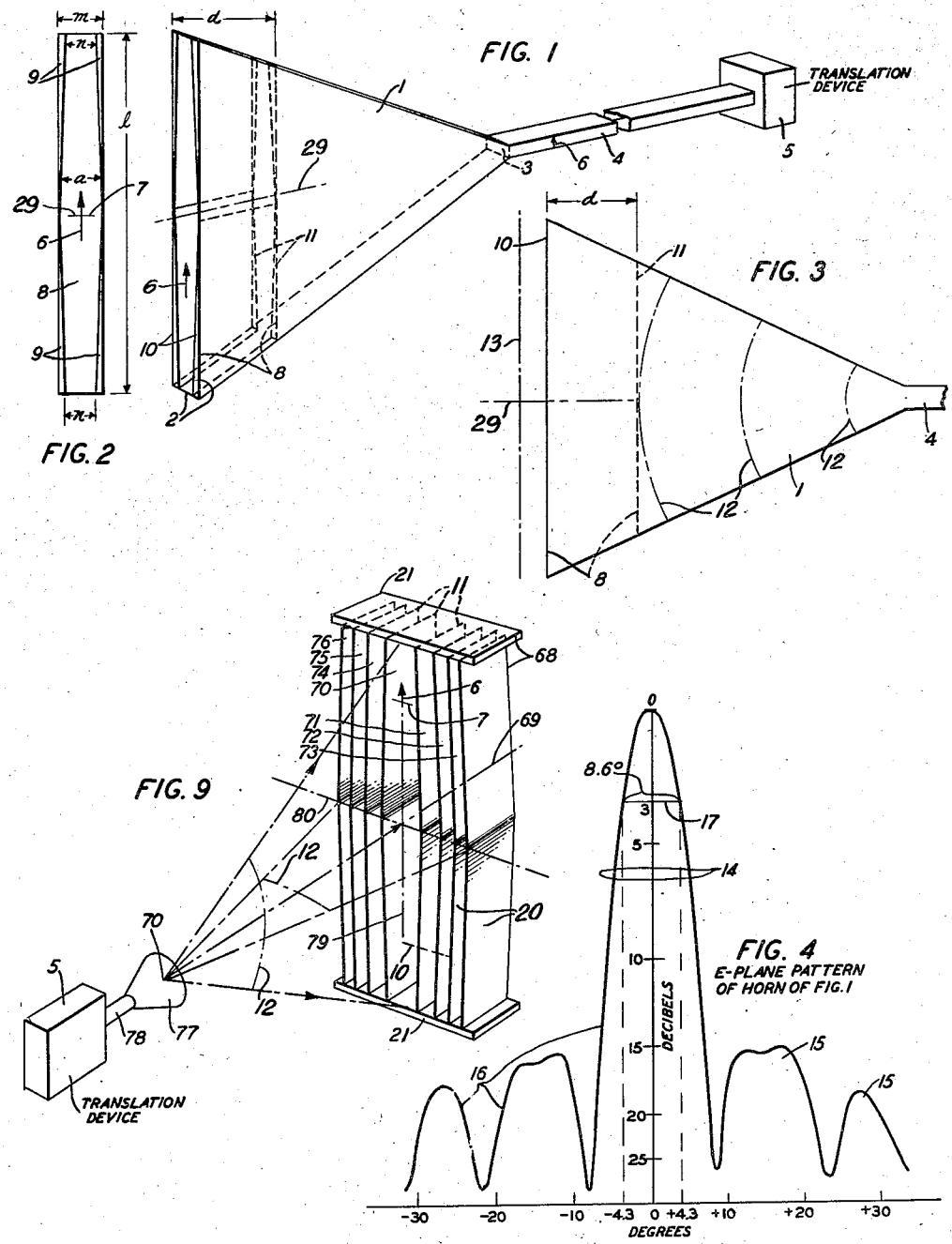

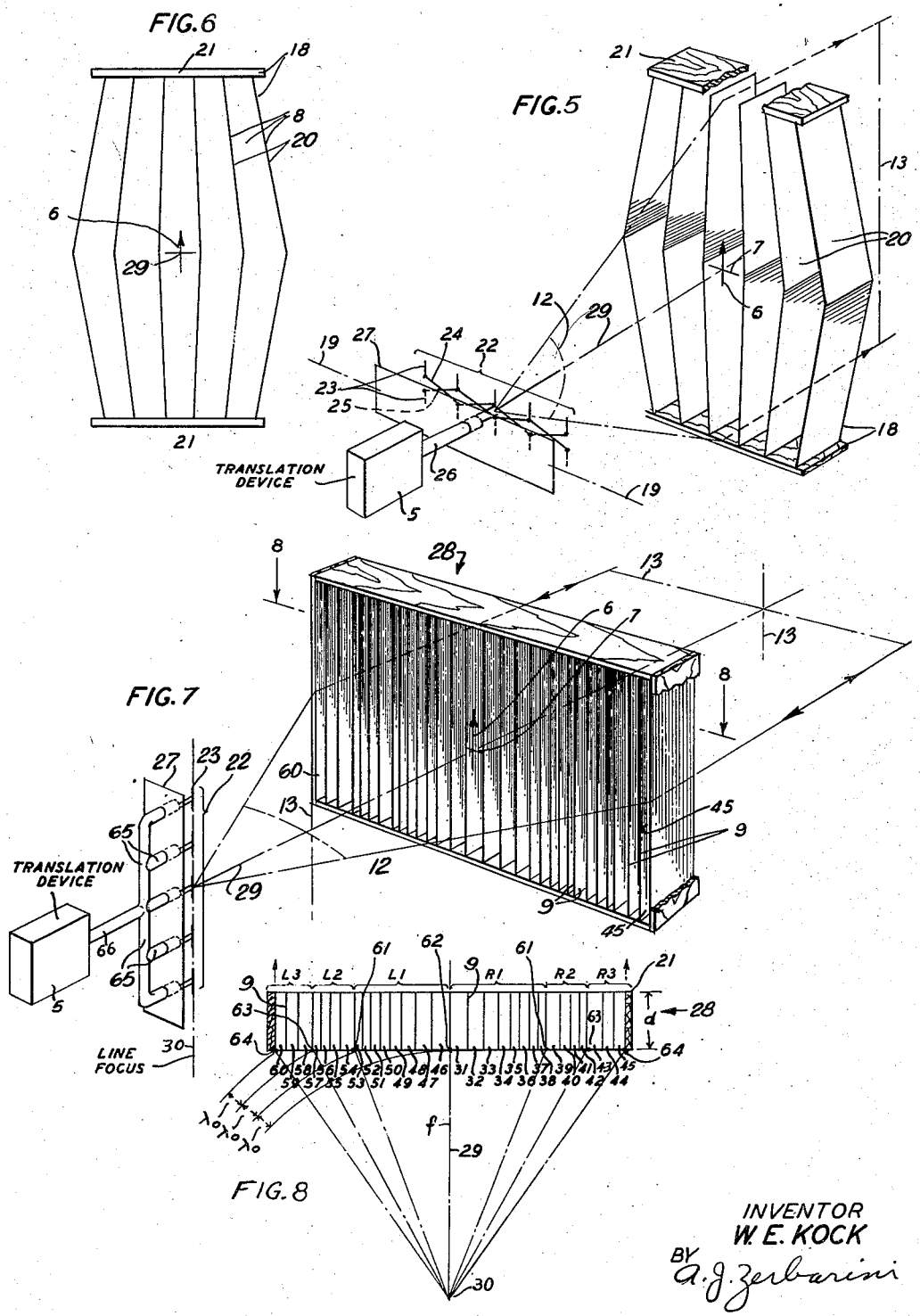

INVENTOR
W. E. KOCK
BY
a. J. Zerbarini
ATTORNEY

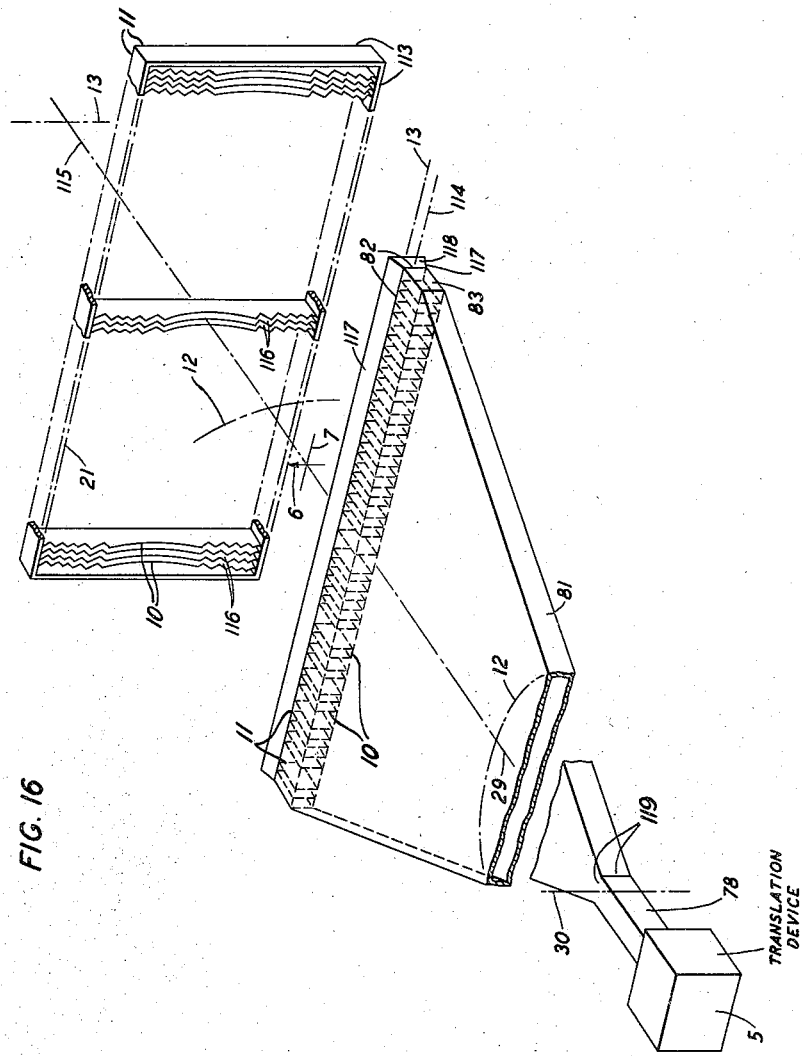

Patented July 31, 1951

2,562,277

UNITED STATES PATENT OFFICE 2,562,277

METALLIC LENS DIRECTIVE ANTENNA SYSTEM

Winston E. Kock, Middletown, N. J., assignor to Bell Telephone Laboratories, Incorporated, New York, N. Y., a corporation of New York Application April 8, 1946, Serial No. 660,338

9 Claims. (Cl. 250—33.63)

This invention relates to directive antenna systems and particularly to radio lenses used in such systems.

As disclosed, respectively, in Patent 2,283,935 (Figs. 16 and 17) to A. P. King and in my copending application Serial No. 642,723, a flat cellular lens having a uniform thickness and comprising a plurality of guides or cells, and a stepped multiple-zone plano-concave lens having a non-uniform thickness and comprising one or more dielectric channels, have been proposed for focusing radio waves. While the uniform thickness feature of the flat lens may be advantageous in certain systems, the focusing action of this lens is considerably less than that of the plano-concave lens, since the flat lens does not comprise a plurality of zones, whereas the concave lens comprises several zones. Accordingly, it now appears desirable to utilize, for certain purposes, a lens having a uniform thickness and a focusing action fairly comparable to that obtained in the above-mentioned stepped multiple-zone concave lens.

It is one object of this invention, in a flat lens, to obtain a greater focusing action than heretofore secured.

It is another object of this invention, in a line-type feed such as a sectoral horn, to focus the waves in the plane of the long dimension of the feed, in a more satisfactory manner than heretofore accomplished.

It is still another object of this invention to obtain a simple, easily constructed radio lens having a uniform depth or thickness.

It is a further object of this invention, in an antenna system comprising a sectoral horn, to focus in all planes and especially in the E and H planes, waves transceived by the horn.

In accordance with one embodiment of the invention, a flat cellular lens comprises several full-wave stepped zones each comprising dielectric cells of uniform depth and different phase velocity characteristics. By reason of the multiple-zone feature an enhanced focusing effect is obtained. The stepped flat lens may be advantageously used in the mouth aperture of a sectoral horn for focusing waves in the plane containing the long dimension of the aperture. Also, the sectoral horn, as equipped with the stepped lens, may be employed as a line feed for a large plano-concave cylindrical lens and, when so utilized, focusing in both the E and H planes, that is, omniplanar focusing, is secured.

In accordance with another embodiment, the H-plane or so-called "a" dimension of a single dielectric channel of uniform thickness is tapered, that is, the phase velocity characteristic and hence the refractive index are tapered, for the purpose of securing focusing action.

In accordance with another embodiment, an omniplanar lens having a point focus and a uniform thickness comprises a plurality of dielectric channels. Each channel has a tapered refractive index and the refractive indices of corresponding portions of the channels are tapered or graded.

The invention will be more fully understood from a perusal of the following specification taken in conjunction with the drawing on which like reference characters denote elements of similar function and on which:

Figs. 1, 2 and 3 are perspective, front and side views, respectively, of one embodiment of the invention comprising a dielectric channel having a tapered refractive index, and Fig. 4 is a measured directive pattern for this embodiment;

Figs. 5 and 6 are perspective and front views, respectively, of another embodiment of the invention comprising a plurality of channels having similarly tapered refractive indices;

Figs. 7 and 8 are perspective and top sectional views of another embodiment of the invention comprising a stepped multiple-zone channel lens, the channels having different indices and each channel having a uniform index;

Fig. 9 is a perspective view of another embodiment of the invention comprising a flat channel lens, the channels having different indices and each channel having a tapered index;

Figure 10:
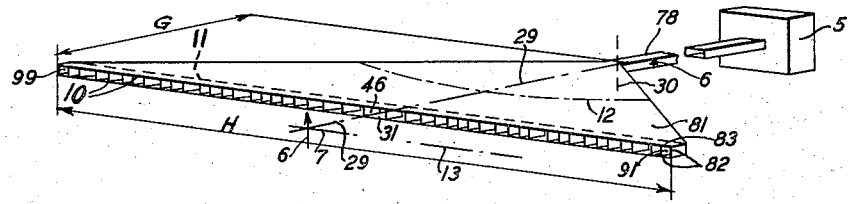
Figure 11:
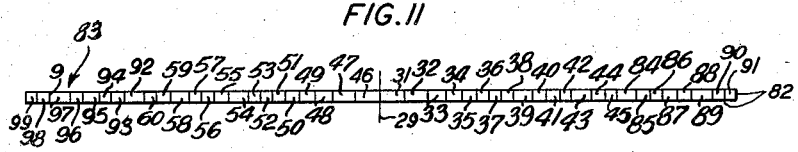
Figure 12:
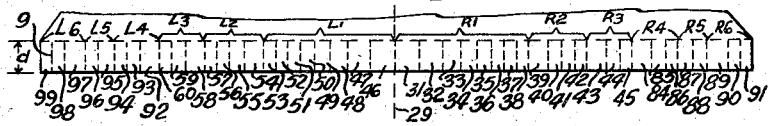
Figure 13:
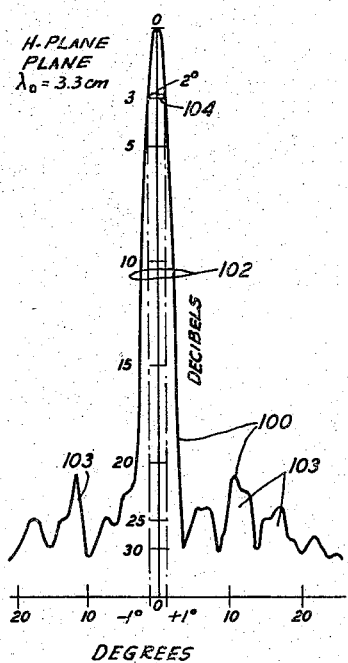
Figure 14:
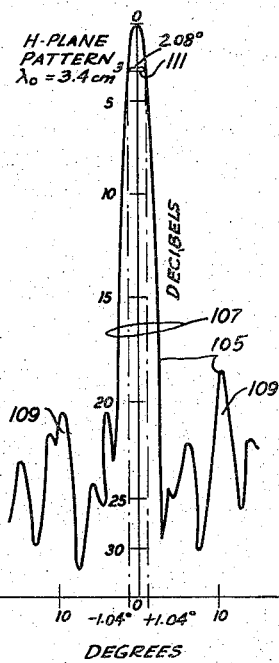
Figure 15:
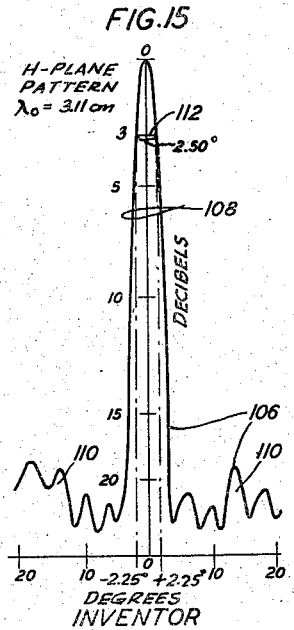

Figs. 10, 11 and 12 are perspective, front and partial top views, respectively, of a sectoral horn equipped with a stepped flat lens of the invention, and Figs. 13, 14 and 15 are directive patterns for the horn of Figs. 10, 11 and 12;

Fig. 16 is a perspective view of a directive antenna system constructed in accordance with the invention and comprising a main plano-concave lens and the sectoral horn of Figs. 10, 11 and 12.

Referring to Figs. 1, 2 and 3, reference numeral 1 denotes a sectoral horn having a mouth aperture 2 and a throat aperture 3, and numeral 4 denotes a guide connecting the throat aperture 3 to a translation device 5 such as a transmitter or receiver. The horn 1 is flared in the E-plane, which contains the electric polarization of the propagated wave and represented by the arrows 6, but not in the H-plane 7. The long and short dimensions of the mouth aperture 2 are denoted by the reference characters $l$ and $m$, respectively. Numeral 8 denotes a dielectric channel or lens mounted in the mouth aperture 2 of the horn 1 and having an electromagnetic axis 29. The lens 8 comprises the wedge-shaped wall members 9 and the air dielectric medium included therebetween. The depth $d$ of the channel 8 is uniform and both the front face 10 and the back face 11 of the lens 8 are plane, so that the lens is of the plano-plano or flat type. As shown on the drawing, the width or $a$ dimension of channel 8 is tapered from a maximum value $m$ at the midpoint to equal minimum values $n$ at the top and bottom extremities. Hence, and as explained in my copending application mentioned above, the phase velocity characteristic and the refractive index of the channel are tapered. The phase velocity of the channel 8, considered in its entirety, is greater than that of free space; and the phase velocity increases from a minimum at the mid-point or widest portion of the channel to a maximum at each end or narrow channel portion. In one embodiment actually constructed and tested the dimensions $l$, $m$, $n$ and $d$, mentioned above, have values in wavelengths, $\lambda_0$, as measured in the air of $6.76\lambda_0$, $0.77\lambda_0$, $0.56\lambda_0$ and $1.54\lambda_0$, respectively, the design wavelength $\lambda_0$ being 3.4 centimeters.

In transmission, waves supplied by device 5 to guide 4 and horn 1 are propagated through the lens 8 and thence radiated. More particularly, as shown in Fig. 3, waves originating at the throat aperture 3 have a circular wave front, represented by the lines 12, in the E-plane. Since the phase velocity is greater at the top and bottom than at the center, the top and bottom portions of the wave front are advanced more rapidly in phase than the central portion so that the lens 8 converts the circular front to a linear wave front 13. In the H-plane, the front of the emergent wave is also substantially linear, so that the outgoing wave front is flat or plane.

Considered differently, the lens 8 functions to produce in the E-plane a very sharp beam, as shown in Fig. 4. In Fig. 4, numeral 14 denotes the major lobe and numerals 15 denote the minor lobes of the E-plane pattern 16. The major lobe is relatively sharp since its width taken at the half power point 17 is only 8.6 degrees. Also the minor lobes are below fifteen decibels and therefore negligible. Without the lens 8, the beam established by the sectoral horn would be a so-called fan-beam. With the lens 8 in position, however, a point type beam is established. In reception the converse operation obtains, and the lens focuses the incoming rays on the throat aperture 3.

Referring to Figs. 5 and 6, reference numeral 18 denotes a flat quasi-rhombic channel lens comprising a plurality of dielectric channels 8 and having a line focus 19 and an electromagnetic axis 29. Each channel comprises two adjacent plate members 20 and the air dielectric therebetween. The plates 20 are held in position by the wooden members 21. While the channels 8 are each electrically the same as the channel 8 of Fig. 1, the outer channels are bent at the center and the end or narrow channel portions are positioned close together, so as to form a compact structure. Numeral 22 denotes a vertically polarized "line" feed or array aligned with the focal line 19 and comprising the vertical dipoles 23. The dipoles are connected by the transposed conductors 24, 25 and the coaxial line 26 to a translation device 5. Numeral 27 denotes a plane reflector for the array 22.

In transmission, energy is supplied by device 5 over line 26 and conductors 24, 25 to the dipoles 23. The dipoles are energized in phase and establish a wave front which is circular in the E or vertical plane. In this plane the lens 18 functions to convert the circular wave front 12 to a linear front 13, whereby a high degree of directivity is secured. In reception the incoming rays are focused by the lens 18 on the linear array 22 coincident with the focal line 19.

Referring to Figs. 7 and 8, reference numeral 28 denotes a three-zone flat lens having an axis 29 and a focal line 30. The lens 28 comprises a plurality of dielectric channels denoted by numerals 31–60, inclusive. The channels have a uniform depth $d$ and different H-plane or "$a$" dimensions and each channel comprises a pair of metallic plates 9 and the air dielectric included therebetween. The section of the lens 28 at the right of axis 29 is divided into three half zones $R_1$, $R_2$, and $R_3$ and, similarly, the section at the left is divided into three half zones $L_1$, $L_2$ and $L_3$. In more detail, the right central channels 31—38 and the left central channels 46—53 constitute the first or central zone $R_1L_1$; the right channels 39—42 and the left channels 54—57 constitute the second zone $R_2L_2$, and the channels 43—45 and 58—60 constitute the third zone $R_3L_3$. It will be noted that in each zone the channels positioned at the left and right of axis 29 and spaced equally from axis 29 have equal $a$ dimensions; that is, channels 31—45 correspond, respectively, to channels 46—60. The zones are full wavelength zones. Thus, the distances between the focus 30 and the junction points 61 of zones $R_1L_1$ and $R_2L_2$ are each a wavelength $\lambda_0$, as measured in air, greater than the focal length $f$ or distance between the focus 30 and the junction 62 on axis 29 of the two half zones $R_1$ and $L_1$. The distances between the junction points 63 of zones $R_2L_2$ and $R_3L_3$ and the focus 30 are each two wavelengths, $2\lambda_0$, greater than $f$; and the distances between the extremities 64 of zone $R_3L_3$ are each $3\lambda_0$ greater than $f$.

In each half zone, the $a$ dimensions, and therefore the phase velocities and refractive indices for the several channels are selected so that the differently phased waves emitted at the focus 30 and passing through the channels emerge from the channels in like phase or, stated differently, so that a circular wave front originating at the focus 30 is converted to a plane wave front. Considering, for example, the channels 31—38 in the half-zone $R_1$ the refractive index $n$ of each channel is less than unity and, proceeding from the innermost channel 31 to the extreme channel 38 of the half-zone, the refractive indices for the channels decrease. The actual values of the indices are determined by the so-called cut-and-try method and the corresponding $a$ dimensions are determined from the following equations which are given in my copending application Serial No. 642,723.

$$d = \frac{\lambda_0}{1-n} \quad (1)$$

$$n = \frac{V_0}{V} = \sqrt{1 - \left(\frac{\lambda_0}{2a}\right)^2} \quad (2)$$

where
$d$ = thickness of lens
$n$ = refractive index
$V_0$ = phase velocity in free space
$V$ = phase velocity in the channel
$\lambda_0$ = wavelength in free space
$\lambda$ = wavelength in the channel
$a$ = H-plane dimension of channel Hence, the number of channels in each half zone and the widths of the channels are dependent upon the indices selected; and each half zone may include a plurality of channels differing from the plurality shown on the drawn. In one practical embodiment, designed for a wavelength of $\lambda_0$ equal to 3.3 centimeters, the depth $d$ of the lens is 1.54 $\lambda_0$; and the $a$ dimensions of the fifteen right channels 31—45, and the fifteen left channels 46—60, were, respectively, 1.23, 1.08, 0.884, 0.75, 0.655, 0.616, 0.576, 0.557, 0.964, 0.692, 0.608, 0.554, 0.964, 0.662, and 0.569, as measured in wavelengths in the air.

The primary antenna for energizing the lens 28 or receiving energy therefrom comprises a linear array 22 of vertical dipoles 23 each aligned with the focal line 30 of lens 28. The dipoles 23 are positioned in front of a plane reflector 27 and are connected by the branch coaxial lines 65, and the main line 66 to a translation device 5.

In operation, Figs. 7 and 8, assuming device 5 is a transmitter, the dipoles are supplied with radio waves over lines 66 and 65 and a wave having a linear front 13 in the E-plane 6 and a circular front 12 in the H-plane 7, that is, a cylindrical wave, is emitted toward the lens 28. In the H-plane, the lens 28 transforms the circular front 12 to a linear front 13 and, in the E-plane, the wave front is not changed, so that the emergent wave has a plane wave front. Considered differently, in each of zones $R_1L_1$, $R_2L_2$ and $R_3L_3$, the wavelets entering the innermost channel as, for example, channel 31, arrive advanced in phase relative to the wavelets arriving at the remaining channels as, for example, channel 32. The phase velocity of channel 32 is greater than that of channel 31 and such that the two wavelets emerge in phase agreement. Hence, for any of the three zones, the wavelets emerging from the several channels of the zone are in phase. The wavelets emerging from the three zones are in phase agreement since the phase angles of the wavelets outgoing from zone $R_1L_1$ differ by 360 and 720 degrees, respectively, from the wavelets outgoing from zones $R_2L_2$ and $R_3L_3$. Since the lens has a plurality of zones the focusing action is relatively great and considerably greater than that obtainable in a single zone flat lens. In reception the converse operation obtains. More particularly, the linear wave front 13 in the H-plane 7, of the incoming waves is converted by the lens 28 into a circular wave front 12 converging on the array 22 aligned with the focal line 30, that is, in the H-plane 7 the incoming rays are focused on the linear array 22. In the E-plane 6, the incoming linear wave front 13 is not changed by the lens 28.

In the above description of the flat lens of Figs. 7 and 8, it has been assumed that the dielectric medium in the several channels is air having a dielectric constant of unity. With the dielectric constant uniform throughout the lens, the $a$ dimensions are proportioned to secure the focusing effect. The phase velocity and the refractive index are, however, dependent upon both the $a$ dimension and the dielectric constant of the cell or guide, as explained in my copending application Serial No. 642,723 mentioned above. Accordingly, if desired, the cells 31 to 60 may have equal $a$ or H-plane dimensions, provided different dielectric substances having properly selected dielectric constants are used in the cells.

Referring to Fig. 9, reference numeral 68 denotes a lens having an axis 69 and a focal point 70 and comprising a plurality of dielectric channels 70, 71, 72, 73, 74, 75 and 76. Numeral 77 denotes a point-type horn positioned at the focal point 70 and connected by the glide 78 to the translating device 5. The $a$ dimension of each channel is tapered, as in the system of Figs. 1, 5 and 6, and the indices of the several channels are graded as in the system of Figs. 7 and 8. In each channel the maximum refractive index is less than unity and the index at the center of the channel is greater than that at each extremity. Also, proceeding horizontally from the vertical axial plane 79, the maximum $a$ dimensions, and therefore the maximum refractive indices of the channels decrease, and the values of the minimum phase velocities for the channels increase. Similarly, proceeding horizontally from the vertical axial plane 79, the minimum $a$ dimensions decrease and the maximum phase velocities increase; and for intermediate points in the channels above or below, and spaced at equal distances from the horizontal axial plane 80, the $a$ dimensions decrease and the phase velocities increase. As in the lens of Fig. 1, a taper for each channel is selected, by the cut-and-try method, so that the desired focusing in the E-plane 6 is obtained and, as in the system of Figs. 7 and 8, the refractive indices of the several channels are selected so that the desired focusing in the H-plane 7 is secured.

The operation of the system of Fig. 9 is believed to be obvious in view of the discussion given above in connection with Figs. 1, 7 and 8. Briefly, the horn 77 emits a spherical wave front which, by reason of the focusing action of lens 68 in both the H and E-planes, is converted to a plane wave front. In reception, the incoming rays are focused in both planes upon the horn 77.

Referring to Figs. 10, 11 and 12, reference numeral 81 denotes a sectoral horn which is connected by guide 78 to the device 5. The horn is flared in the H-plane 7, but not in the E-plane 6, and has a rectangular or substantially linear mouth aperture 82. A six-zone flat lens 83, similar to the lens 28 of Figs. 7, 8 is positioned in the mouth aperture, the six zones of the lens 83 being denoted by the reference characters $R_1L_1$, $R_2L_2$, $R_3L_3$, $R_4L_4$, $R_5L_5$ and $R_6L_6$. As in Fig. 8 numerals 31—45 and 46—60 denote the channels in zones $R_1L_1$, $R_2L_2$ and $R_3L_3$. Numerals 84, 85, 86, 87, 88, 89, 90 and 91 denote the channels in half zones $R_4$, $R_5$ and $R_6$; and numerals 92—99 designate the channels in the half zones $L_4$, $L_5$ and $L_6$. In one embodiment of Figs. 10, 11 and 12, actually constructed and tested for a value of $\lambda_0=3.3$ centimeters, the channels 31—45 and 46—60 in the three central zones $R_1L_1$, $R_2L_2$ and $R_3L_3$ have the same $a$ dimensions as those given above for a practical embodiment of Figs. 7 and 8. Also, in the actual embodiment of Figs. 10, 11 and 12, $d$ has a value of 1.54$\lambda_0$ and the $a$ dimensions of channels 84—91 and 92—99 are, respectively, 0.955, 0.630, 0.554, 0.805, 0.600, 1.00, 0.615 and 0.550 as measured in wavelengths $\lambda_0$. The sectoral horn actually tested has an axial length G of about 23 wavelengths; and the long dimension H of the mouth aperture is 36 wavelengths.

In operation, the lens 83 function to focus the waves in the H-plane 7 or, stated differently, to convert the circular front 12 to a linear front 13, whereby in this plane a sharp beam is secured. Thus, referring to Fig. 13, numeral 100 denotes the measured H-plane directive pattern taken at the mean or design wavelength of 3.3 centimeters of a horn 81 equipped with a flat lens 83, as shown in Fig. 10. Numeral 102 denotes the major lobe and numeral 103 designates the minor lobes. As shown in Fig. 13, the beam in the H-plane is very sharp, the width of the major lobe 102 at the half power point 104 being only 2.0 degrees. The measured gain of the horn of Fig. 10 over a standard reference antenna is 29.6 decibels. In the E-plane, the beam or major lobe of the horn 81 is somewhat wider so that a fan beam, rather than a point beam, is produced. The minor lobes 103 are below 20 decibels and are therefore negligible, as is desired.

Numerals 105 and 106, Figs. 14 and 15, designate the measured H-plane patterns taken at the side or off frequencies corresponding respectively, to 3.4 and 3.11 centimeters. Numerals 107 and 108 denote the major lobes, and numerals 109 and 110 denote the minor lobes of H-plane patterns 105 and 106, respectively; and numerals 111 and 112 designate the half power points of major lobes 107 and 108, respectively. The half power widths 111 and 112 are, respectively, 2.08 and 2.5 degrees, and the minor lobes 109 and 110 are below 18 decibels. Hence, the three H-plane patterns 102, 107 and 108 are substantially the same and the lens 83 has a wide band characteristic.

As shown in Fig. 16 the sectoral horn 81, equipped with a lens 83, may be used with advantage as a line feed for a passive antenna member such as a lens or a reflector having a line focus. In Fig. 16, numeral 113 designates a stepped plano-concave, cylindrically symmetrical, metallic lens of the type disclosed in my copending application Serial No. 642,723. The lens 113 has a line focus 114 and an electromagnetic axis or axial plane 115, and comprises a plurality of dielectric channels 116. The long or H-plane dimension of the mouth aperture 82 of horn 81, and therefore the longitudinal or H-plane dimension of the flat lens 83 is aligned with the focal line 114; and the axis 115 of lens 113 coincides with the axis 29 of lens 83. In order to secure optimum illumination of the main lens 113, the mouth aperture 82, and hence one face of the lens 83, is equipped with the horn flares 117 and associated end pieces 118. Numeral 119 denotes the throat aperture of horn 81.

In operation, waves supplied by device 5 are focused, in the H-plane 7, by the stepped flat cellular lens 83, as explained in connection with Fig. 10, and in this plane a very sharp beam is established. In the E-plane 6, the main lens 113 functions to focus the rays. Consequently, omniplanar focusing is secured. More specifically, considering transmission in the H-plane 7, the lens 83 converts the circular wave front 12 emanating from the horn throat aperture 119 to a linear wave front 13 at the horn mouth aperture 82. In the E-plane 6, the lens 113 converts a circular wave front 12 originating at the mouth aperture 82 to a linear wave front 13, whereby a flat front 13, 13 is established. In reception the converse operation obtains. The incoming rays are focused in the E-plane by lens 113 on the flat lens 83 and, in the H-plane, the rays are focused on the throat aperture 119 of horn 81 by the flat lens 83. The throat aperture 119, which is coincident with focal line 30, constitutes a primary antenna. Considered from another standpoint, the lenses 83 and 113 are each uniplanar, that is, each lens focuses in one plane only and, since the focal lines 30 and 114 are perpendicular, the focusing planes are perpendicular.

Although the invention has been explained in connection with certain embodiments it is to be understood that it is not to be limited to the embodiments described inasmuch as other apparatus may be employed in practicing the invention.

What is claimed is:

1. A sectoral horn having a pair of flared sides and a pair of parallel sides, and a metallic lens in the mouth of said horn, said lens comprising a plurality of conductive plates positioned perpendicularly with respect to the said pair of parallel sides of said horn, said plates subdividing the mouth aperture of said horn into wave passages varying in width across the mouth of the horn by amounts related to the wavelength to focus waves transmitted through said horn and lens in a plane parallel to said parallel sides.

2. A flat cellular metallic lens for focusing waves of a given wavelength, said lens having an axis and a focus, said lens comprising a plurality of adjoining zones positioned along a line perpendicular to said axis and each comprising a plurality of metallic cells having different refractive indices each smaller than unity, said cells being positioned at different distances from said axis, the distances from the junctions of said zones to said focus differing from each other by a multiple, including the integer one, of said wavelength.

3. A flat cellular lens for focusing waves having a given wavelength and a given electric polarization, said lens having an axis and a focus and comprising a plurality of adjoining zones positioned along a line perpendicular to said polarization, each zone comprising a plurality of metallic cells having different widths measured along said line and being positioned at different distances along said line from said axis, the refractive indices of said cells being inversely related to the distances of the cells from said axis and the distances from said focus to adjacent junctions of said zones differing a wavelength.

4. A flat metallic lens for focusing waves having a given electric polarization, said lens having a uniform thickness and a focus and comprising at least two cells having equal refractive indices, each cell comprising conductive walls extending parallel to said polarization, one cell being a wavelength or a multiple thereof farther away from said focus than the other cell.

5. In combination, a sectoral horn having a pair of parallel sides and a pair of angularly related sides and a flat lens positioned in the mouth of said horn for focusing waves having a given electric polarization, said lens comprising a plurality of cells having different refractive indices, each cell comprising a pair of flat conductive walls positioned parallel to said polarization.

6. In combination, a sectoral horn having a pair of parallel sides and a pair of angularly related sides, and a multiple-zone flat cellular lens in the mouth of said horn, said lens comprising conductive plates extending perpendicular to said parallel horn sides, providing wave passages proportioned in width with respect to one another in each zone to give an overall focusing effect.

7. In combination, a main lens having a line focus, a sectoral horn having the long dimension of its mouth aperture aligned with said line focus and a multiple-zone flat lens in said aperture.

8. In combination, a main plano-concave lens having a line focus, a sectoral horn aligned with said focus, and an auxiliary lens positioned between said horn and said main lens.

9. A multi-zone lens, having a focus, for converting a wave front curved in one plane to a planar wave front or vice versa comprising a linear array of parallel short sections of wave guides arranged side by side in a central zone and in one or more zones on either side of said central zone the phase velocities of the guides within each zone increasing from guide to guide outwardly in either direction from the center of the lens, the junctions between adjacent zones being at respective distances from the focus differing by a wave length or integral multiple thereof.

WINSTON E. KOCK.

REFERENCES CITED

The following references are of record in the file of this patent:

UNITED STATES PATENTS

| Number | Name | Date |
| --- | --- | --- |
| 1,332,410 | Potts | Mar. 2, 1920 |
| 1,496,652 | Cooper | June 3, 1924 |
| 1,958,996 | Hansen et al. | May 15, 1934 |
| 2,035,827 | Newell | Mar. 31, 1936 |
| 2,283,935 | King | May 26, 1942 |
| 2,309,626 | Conrad | Feb. 2, 1943 |
| 2,376,428 | Hansell | May 22, 1945 |
| 2,405,242 | Southworth | Aug. 6, 1946 |
| 2,415,352 | Iams | Feb. 4, 1947 |
| 2,415,807 | Barrow et al. | Feb. 18, 1947 |

OTHER REFERENCES

"On a Method of Decreasing the Reflection from Nonmetallic Substances," by John Strong, in the Journal of Optical Society of America, pp. 73 and 74, of January 1936, vol. 26.